United States Patent
Junod et al.

(10) Patent No.: US 9,389,133 B2
(45) Date of Patent: Jul. 12, 2016

(54) PORTABLE OBJECT PROVIDED WITH A DEVICE FOR MEASURING ATMOSPHERIC PRESSURE

(71) Applicant: Montres Breguet SA, L'Abbaye (CH)

(72) Inventors: Benoit Junod, Peillonnex (FR); Davide Sarchi, Renens (CN); Alain Zaugg, Le Sentier (CH); Jan Pittet, Le Sentier (CH)

(73) Assignee: Montres Breguet SA, L'Abbaye (CH)

( * ) Notice: Subject to any disclaimer, the term of this patent is extended or adjusted under 35 U.S.C. 154(b) by 213 days.

(21) Appl. No.: 14/219,174

(22) Filed: Mar. 19, 2014

(65) Prior Publication Data

US 2014/0373624 A1    Dec. 25, 2014

(30) Foreign Application Priority Data

Jun. 24, 2013    (EP) .................................... 13173403

(51) Int. Cl.
  *G01L 7/20* (2006.01)
  *G01L 7/02* (2006.01)
  *G01C 5/06* (2006.01)
  *G04B 47/06* (2006.01)

(52) U.S. Cl.
  CPC ... *G01L 7/02* (2013.01); *G01C 5/06* (2013.01); *G04B 47/066* (2013.01)

(58) Field of Classification Search
  None
  See application file for complete search history.

(56) References Cited

U.S. PATENT DOCUMENTS

| | | | | |
|---|---|---|---|---|
| 3,653,203 A * | 4/1972 | Hurt | ...................... | G04B 47/06 368/278 |
| 5,178,010 A * | 1/1993 | Holzel | ..................... | G01W 1/04 346/21 |
| 7,242,639 B2 * | 7/2007 | Blondeau | ............... | G04G 21/02 368/11 |
| 7,345,956 B2 * | 3/2008 | Matthey | ................. | G04G 21/02 368/11 |
| 2004/0233788 A1 | 11/2004 | Plancon et al. | | |
| 2007/0014193 A1 | 1/2007 | Plancon et al. | | |
| 2007/0153633 A1 | 7/2007 | Plancon et al. | | |
| 2008/0062818 A1 | 3/2008 | Plancon et al. | | |
| 2010/0170337 A1 * | 7/2010 | Ahlstrom | ................ | G01L 19/08 73/384 |
| 2011/0069589 A1 | 3/2011 | Plancon et al. | | |

(Continued)

FOREIGN PATENT DOCUMENTS

CH           693 155 A5      3/2003
WO    WO 2013/079810 A1     6/2013

OTHER PUBLICATIONS

European Search Report issued Jan. 16, 2014 in EP Application 13173403, filed on Jun. 24, 2013 ( with English translation).

*Primary Examiner* — Andre Allen
(74) *Attorney, Agent, or Firm* — Oblon, McClelland, Maier & Neustadt, L.L.P (57) ABSTRACT

Portable object provided with a mechanism for measuring atmospheric pressure, the atmospheric pressure measuring mechanism including an atmospheric pressure sensor whose geometric dimensions vary with atmospheric pressure fluctuations, the variations in the geometric dimensions of the atmospheric pressure sensor being applied to a device displaying a barometric tendency connected to the atmospheric pressure sensor via a coupling mechanism actuated by a user, the coupling mechanism being capable of being switched between a first position, in which the kinematic connection between the atmospheric pressure sensor and the barometric tendency display device is interrupted, and a second position in which the barometric tendency display device is kinematically coupled to the atmospheric pressure sensor.

27 Claims, 6 Drawing Sheets

(56) References Cited

U.S. PATENT DOCUMENTS

2012/0285242 A1* 11/2012 Miyake .................. G01W 1/02 73/384

2014/0174175 A1* 6/2014 Chun ..................... G01C 5/06 73/384

2014/0260606 A1* 9/2014 Shannon ................ G01W 1/02 73/384

* cited by examiner

PORTABLE OBJECT PROVIDED WITH A DEVICE FOR MEASURING ATMOSPHERIC PRESSURE

This application claims priority from European Patent Application No. 13173403.0 filed 24 Jun. 2013 the entire disclosure of which is incorporated herein by reference.

FIELD OF THE INVENTION

The present invention concerns a portable object of small dimensions, such as a wristwatch, provided with a device for measuring atmospheric pressure capable of providing an indication of atmospheric pressure variation at the place where the user of the portable object is located.

BACKGROUND OF THE INVENTION

Wristwatches provided with a device for measuring atmospheric pressure are already known. These wristwatches conventionally include a pressure sensor, for example of the aneroid type, whose geometric dimensions vary with fluctuations in atmospheric pressure. In a known embodiment, the variation in the geometric dimensions of the pressure sensor with atmospheric pressure fluctuations is converted into a linear motion of a feeler, which in turn controls the pivoting of a lever. The pivoting motion of the lever is in turn converted into a rotational motion of a gear train which meshes with a display wheel in a drive ratio calculated such that an altitude indicator hand carried by the display wheel provides the user of the watch with a legible altitude indication.

Constructions of the type briefly described above are typically used to provide the user of the watch with an indication of the altitude of the place where he is located. It is known that the atmospheric pressure value is a function of the altitude of the place where atmospheric pressure is measured. It is also known that the altitude indication provided by the watch may be distorted because of meteorological variations. Thus, even if the user of the watch does not change location, it is possible for the watch to provide a changing indication of the altitude of that location under the effect of atmospheric pressure fluctuations.

It is therefore useful to associate a barometric device with an altimeter device. Indeed, as a result of the barometric device, it is possible to provide an indication of the local atmospheric pressure variation over time. This indication may then be used either to correct the altitude indication, or to predict the evolution of meteorological conditions.

The drawback of this type of solution lies, however, in the fact that it is difficult to envisage integrating an altimeter device combined with a barometric device in a portable object of small dimensions, such as a wristwatch.

SUMMARY OF THE INVENTION

It is an object of the present invention to overcome this drawback in addition to others by providing a portable object of small dimensions, such as a wristwatch, provided with a barometric device capable of providing an indication of the local atmospheric pressure variation over time.

The present invention therefore concerns a portable object provided with a device for measuring atmospheric pressure, the atmospheric pressure measuring device including an atmospheric pressure sensor whose geometric dimensions vary with atmospheric pressure fluctuations, the variations in geometric dimensions of the atmospheric pressure sensor being applied to a device displaying a barometric tendency connected to the atmospheric pressure sensor via a coupling mechanism actuated by a user, the coupling mechanism being able to be switched between a first position, in which the kinematic chain between the atmospheric pressure sensor and the barometric tendency display device is interrupted, and a second position in which the barometric tendency display device is kinematically coupled to the atmospheric pressure sensor.

As a result of these features, the present invention provides a portable object provided with an atmospheric pressure measuring device as a result of which it is possible to display a meteorological tendency indicating to the user either stable weather, or deteriorating weather (low pressure conditions), or improving weather (anticyclonic conditions). By coupling the barometric tendency display device to the atmospheric pressure sensor for a sufficiently long period for the atmospheric pressure variation measurement to be meaningful, the user can thus ascertain the meteorological trend. Further, when the user moves and the altitude at which he is located varies, he has the possibility of uncoupling the barometric tendency display device from the atmospheric pressure measurement display so that the barometric tendency display device does not provide erratic indications. In an improved embodiment of the invention described below, it is also possible to correct the altitude indication according to stored atmospheric pressure variations. Of course, for the atmospheric pressure variation measurement to be meaningful, the measurement must be carried out without the user changing location. In the opposite case, the altitude of the place where the user is located may vary, which results in atmospheric pressure variations which distort determination of the meteorological trend.

According to a complementary feature of the invention, the barometric tendency display device includes a display cam. The display cam is either a snail cam, or a cam having a profile of intermediate radius framed by a profile of smaller radius and a profile of greater radius.

According to yet another feature of the invention, the coupling mechanism includes a coupling wheel carried by a coupling lever, the coupling lever being capable of actuation by the user between a first position in which the coupling wheel does not provide the kinematic link between the atmospheric pressure sensor and the barometric tendency display device, and a second position in which the coupling wheel provides the kinematic link between the atmospheric pressure sensor and the barometric tendency display device.

According to a particular embodiment of the invention, an altitude display device is inserted between the atmospheric pressure sensor and the coupling mechanism, the altitude display device being permanently meshed with the atmospheric pressure sensor and being temporarily meshed with the barometric tendency display device when the coupling mechanism is actuated.

As a result of these features, the present invention provides a portable object capable of permanently providing an altitude indication of the place where the user is located, and further providing, on demand by the user, a meteorological trend indication that predicts the evolution of the weather and, if necessary, correct the altitude indication. Another advantage of this embodiment lies in the fact that it takes advantage of the presence of a pre-existing altitude display device in the portable object to derive additional information therefrom relating to the evolution of the meteorological trend.

BRIEF DESCRIPTION OF THE DRAWINGS

Other features and advantages of the present invention will appear more clearly from the following detailed description of one embodiment of a portable object according to the invention, this example being given merely by way of non-limiting illustration with reference to the annexed drawing, in which.

DETAILED DESCRIPTION OF THE INVENTION

The present invention proceeds from the general inventive idea which consists in fitting a portable object provided with an atmospheric pressure measuring device with a coupling mechanism for coupling, on demand by the user, the atmospheric pressure measuring device to an atmospheric pressure variation display device. With sufficient integration time, it is possible to deduce from the atmospheric pressure measurement an indication as to the meteorological trend (stable weather, low pressure situation if there is a drop in atmospheric pressure, or anticyclonic situation in the case of higher pressure fields). According to a particular embodiment of the invention, advantage is taken of the presence of the pressure sensor conventionally found in altimeter devices to provide, in addition, an indication of the meteorological trend. This enables the user to predict the evolution of the weather and, if necessary, to correct the altitude indication if this has changed due to atmospheric pressure fluctuation.

Figure 1:
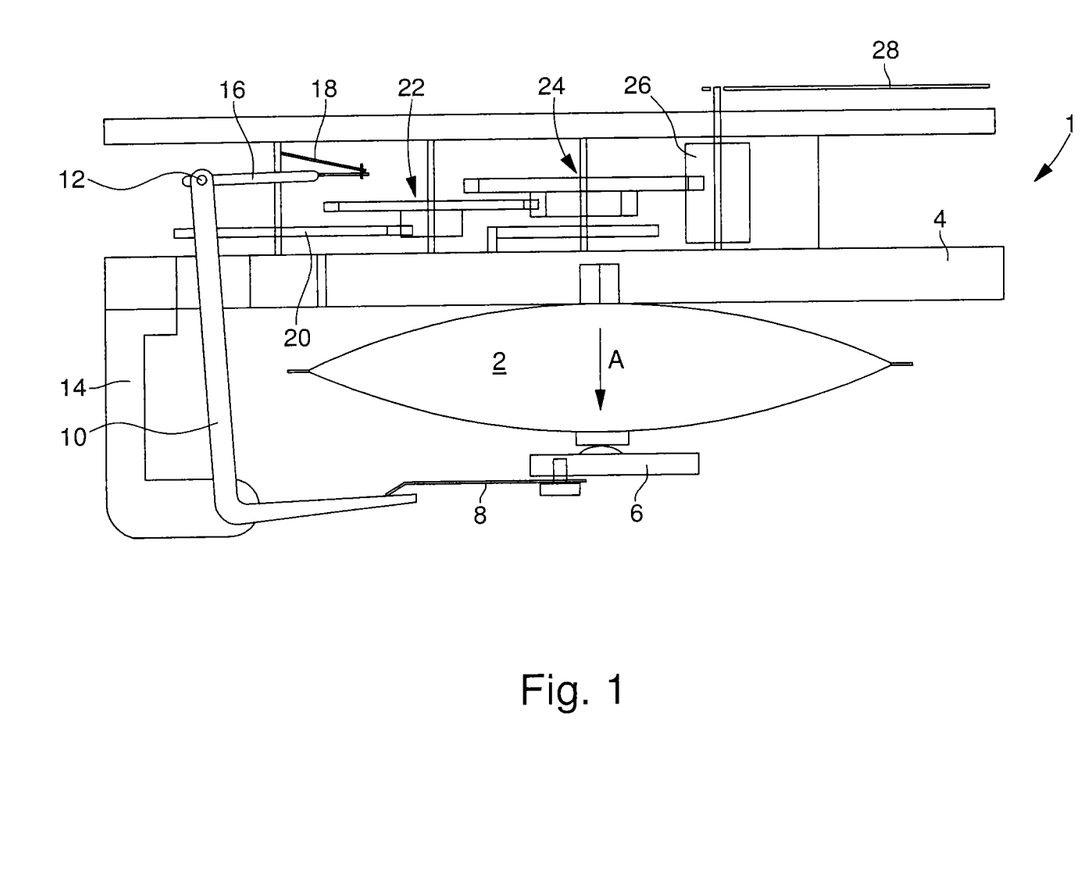
FIG. 1 is a schematic diagram of an altitude display device using an atmospheric pressure sensor.

FIG. 1 shows an atmospheric pressure measuring mechanism. Designated as a whole by the general reference numeral 1, this mechanism includes a mechanical pressure sensor 2, for example of the aneroid type, whose geometric dimensions vary with fluctuations in atmospheric pressure. Pressure sensor 2, arranged underneath a plate 4 which extends parallel to the watch dial (not shown), is deformed in a direction perpendicular to plate 4 represented by arrow A in FIG. 1. The geometric deformations of pressure sensor 2 cause the concomitant movement in the same direction A of a feeler 6 connected, if necessary, by an extender 8 to a swinger 10 pivotably mounted about an axis 12 on a support 14. The linear movement of feeler 6 causes the pivoting of swinger 10 which, via a connecting rod 16 and a lever element 18 in turn drives in rotation a gear train including, by way of non-limiting illustrative example, a wheel 20 and a first and a second multiplier wheel set 22 and 24. The second multiplier wheel set 24 meshes with a display pinion 26 which carries a first hand 28 for displaying a quantity connected to atmospheric pressure. The quantity derived from the atmospheric pressure measurement may be the altitude of the place where the user is located, or the barometric tendency as will be seen below.

The present invention will be described with reference to a wristwatch. It goes without saying however that this example is given purely by way of non-limiting illustration and that the barometric tendency display device according to the invention may be integrated in any type of portable object including an atmospheric pressure sensor.

In a simplified embodiment, the portable object according to the invention only displays a barometric tendency derived from the atmospheric pressure measurement for deducing a meteorological trend indication (stable weather, low pressure situation if there is a drop in atmospheric pressure or anticyclonic situation in the case of higher pressure fields) at the place where the user is located. According to design requirements, any one of wheel sets 20, 22, 24 or 26 of the gear train connecting swinger 10 to first hand 28 displaying the quantity linked to atmospheric pressure may be used as the output 30 of atmospheric pressure measuring mechanism 1 and act as power take off for the barometric tendency display device according to the invention, a first embodiment of which will now be described with reference to FIG. 2.

Figure 2:
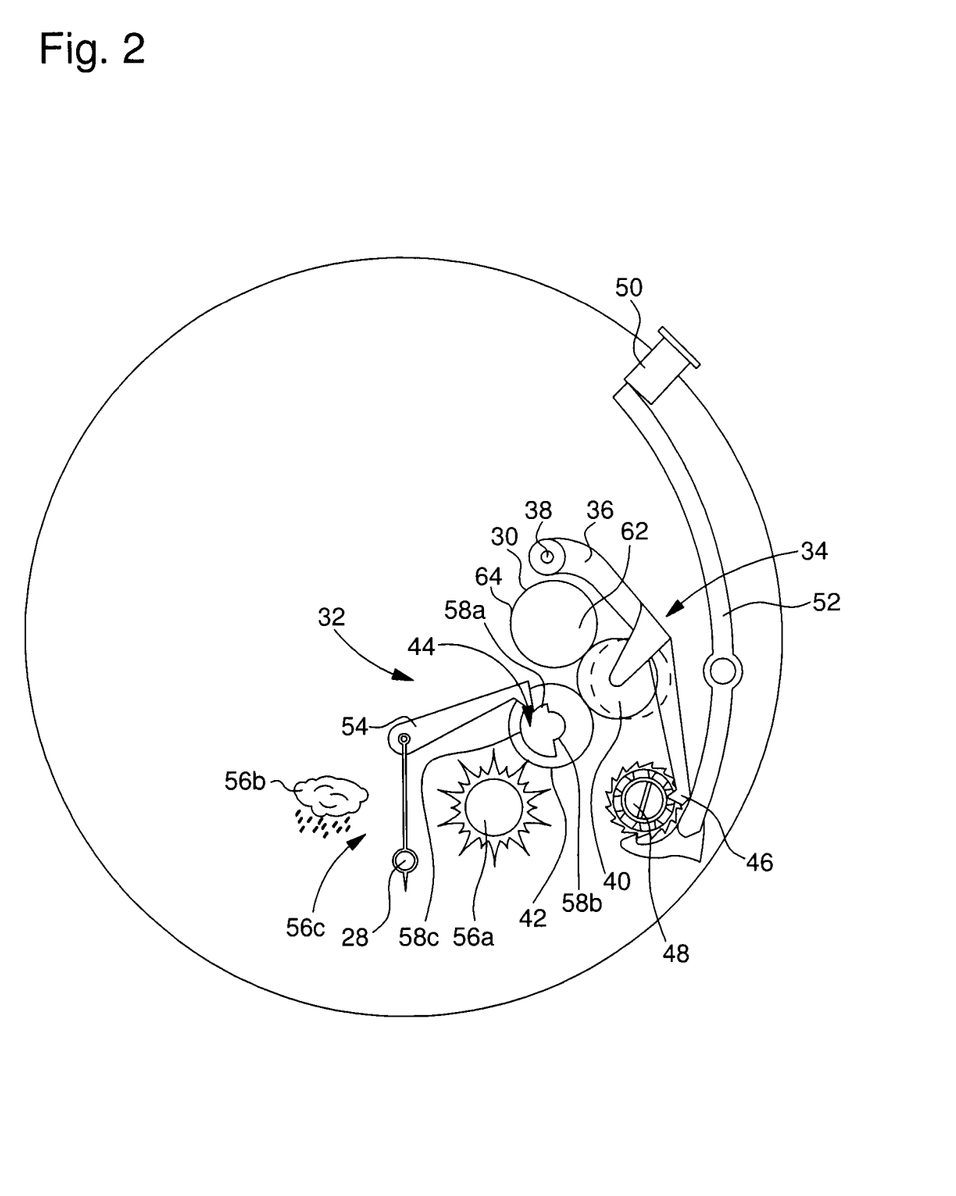
FIG. 2 is a schematic diagram of a first embodiment of a barometric tendency display device connected to an atmospheric pressure sensor via a coupling mechanism according to the invention.

Designated as a whole by the general reference numeral 32, the barometric tendency display device according to the invention is connected to the output 30 of atmospheric pressure measuring mechanism 1 via a coupling mechanism 34 capable of actuation by a user.

Coupling mechanism 34 may be switched, on demand of the user, between a first position (shown in dotted lines in FIG. 2) in which the kinematic connection between atmospheric pressure measuring mechanism 1 and barometric tendency display device 32 is interrupted, and a second position (shown in solid lines in FIG. 2) in which barometric tendency display device 32 is kinematically coupled to atmospheric pressure measuring mechanism 1.

According to an embodiment given purely by way of illustrative example, coupling mechanism 34 includes a coupling lever 36 pivotally mounted about an axis 38 and carrying a coupling wheel 40. According to the position of coupling lever 36, coupling wheel 40 is capable of kinematically connecting output 30 of atmospheric pressure measuring mechanism 1 to a barometric tendency display wheel 42 to which there is connected, directly or via a gear train, a first barometric tendency display cam 44 which will be described in detail below. To be able to switch coupling mechanism 34 between its first and second positions, coupling lever 36 is provided with a beak 46 via which it bears on a column wheel 48 whose movement is controlled by the user via a push button 50 and a control lever 52.

In the example illustrated in FIG. 2, the profile of the first barometric tendency display cam 44 is followed by a first feeler arm 54 which carries a first barometric tendency display hand 28. This first hand 28 moves facing two symbols 56a and 56b, one of which indicates an anticyclonic situation and the other a low pressure situation. The area between the two symbols 56a and 56b is separated by an intermediate area 56c which indicates stable weather. In order to properly control the movement of the first hand 28, the first cam 44 has a profile of intermediate radius 58a corresponding to stable weather and which is framed by a profile of smaller radius 58b corresponding to the low pressure situation and by a profile of greater radius 58c corresponding to the anticyclonic situation.

The barometric tendency display device according to the invention operates as follows. By pressing on push button 50, the user kinematically couples atmospheric pressure measuring mechanism 1 to barometric tendency display device 32. Under the effect of measured atmospheric pressure variations, pressure sensor 2 deforms geometrically, which causes the concomitant pivoting of the first barometric tendency display cam 44. It will be understood that the gear ratio between pressure sensor 2 and first cam 44 is adapted to allow a rotation of first cam 44 which integrates the atmospheric pressure fluctuations over a sufficiently long period to obtain a meaningful indication. Of course, for the measurement to be meaningful, the user must remain in the same place during the measurement time.

Figure 3:
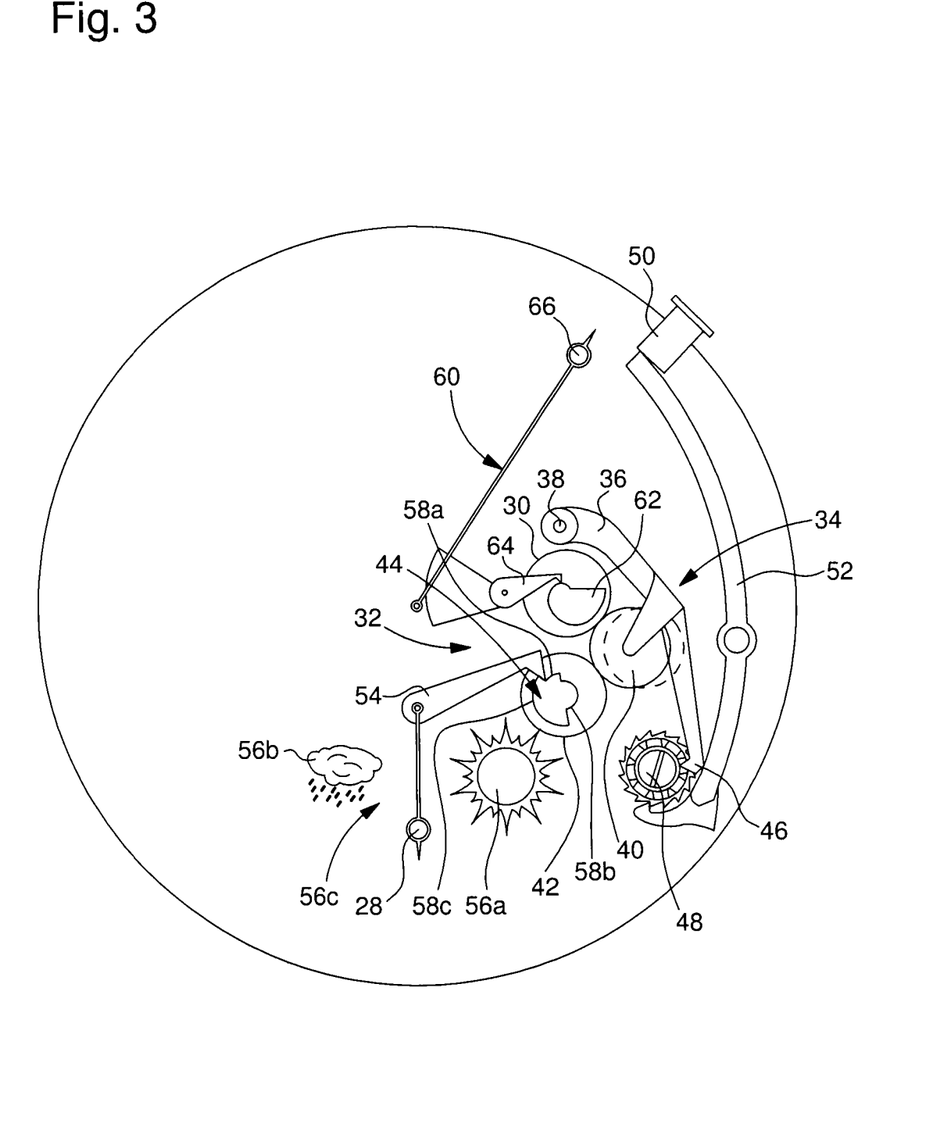
FIG. 3 is a schematic diagram of a variant embodiment of the barometric tendency display device illustrated in FIG. 2 with the integrated altitude display function.

According to a variant embodiment of the invention illustrated in FIG. 3, advantage is taken of the presence of atmospheric pressure measuring mechanism 1 to further provide an altitude indication of the place where the user is located. For this purpose, the output 30 of atmospheric pressure measuring mechanism 1 is connected, directly or via a gear train, to an altitude display device 60 via a second cam 62. The profile of this second cam 62 represents the variation in altitude with the measured atmospheric pressure and is followed by a second feeler arm 64 which carries a second altitude indicator hand 66. It will be noted that, according to this embodiment, the altitude value derived from the measurement provided by atmospheric pressure measuring mechanism 1 may be constantly displayed, regardless of whether or not barometric tendency display device 32 is actuated by the user.

Figure 4:
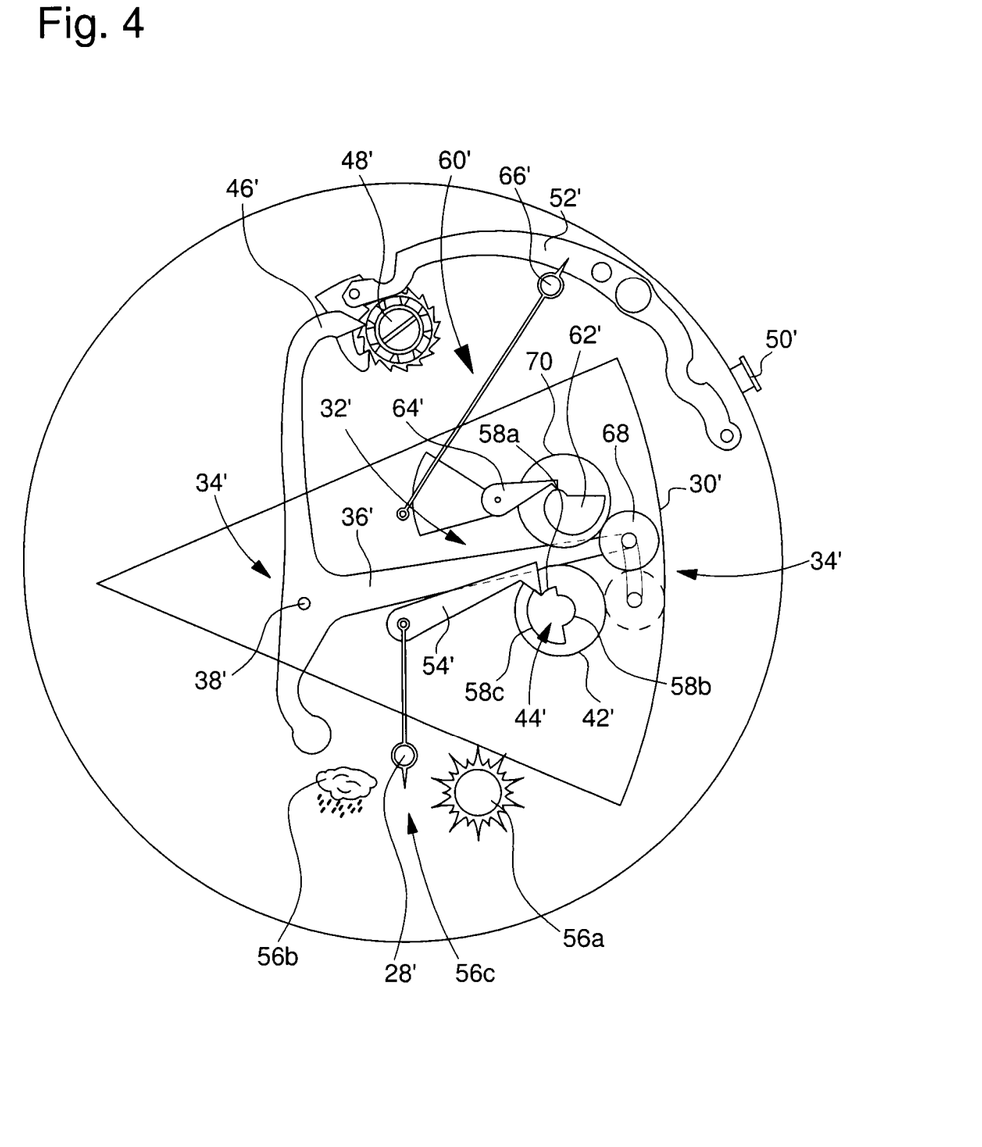
FIG. 4 is a schematic diagram of a second embodiment of a barometric tendency display device connected to an atmospheric pressure sensor via a coupling mechanism according to the invention.

According to a second embodiment of the invention illustrated in FIG. 4, output 30' of atmospheric pressure measuring mechanism 1 takes the form of a rack and may be connected, via a coupling mechanism 34', either to an altitude display device 60', or to a barometric tendency display device 32'.

Coupling mechanism 34' may be switched on demand of the user between a first position (shown in solid lines in FIG. 4) in which coupling mechanism 34' provides the kinematic connection between output rack 30' of atmospheric pressure measuring mechanism 1 and altitude display device 60', and a second position (shown in dotted lines in FIG. 4) in which coupling mechanism 34' provides the kinematic connection between rack 30' and barometric tendency display device 32'.

According to an embodiment given solely by way of illustrative example, coupling mechanism 34' includes a coupling lever 36' pivotally mounted about an axis 38' and carrying a sliding pinion 68 permanently meshed with rack 30'. According to the position of coupling lever 36', sliding pinion 68 is capable of kinematically connecting output rack 30' of atmospheric pressure measuring mechanism 1 either to a barometric tendency display wheel 42', or to an altitude display wheel 70. To be able to switch coupling mechanism 34' between its first and second positions, coupling lever 36' is provided with a beak 46' via which it bears on a column wheel 48' whose movement is controlled by the user via a push button 50' and a control lever 52'.

A first barometric tendency display cam 44' is connected, directly or via a gear train, to barometric tendency display wheel 42'. In the example illustrated in FIG. 4, the profile of the first barometric tendency display cam 44' is followed by a first feeler arm 54' which carries a first barometric tendency display hand 28'. This first hand 28' moves facing two symbols 56a and 56b, one of which indicates an anticyclonic situation and the other a low pressure situation. The area between the two symbols 56a and 56b is separated by an intermediate area 56c which indicates stable weather.

In order to properly control the movement of the first hand 28', the first cam 44' has a profile of intermediate radius 58a corresponding to stable weather and which is framed by a profile of smaller radius 58b corresponding to a low pressure situation and by a profile of greater radius 58c corresponding to an anticyclonic situation.

A second cam 62' is connected directly or via a gear train to the output 30' of atmospheric pressure measuring mechanism 1. The profile of this second cam 62' which represents altitude variation with measured atmospheric pressure is followed by a second feeler arm 64' which carries a second altitude indicator hand 66'.

It will be noted that, according to the invention, the altitude value derived from the measurement provided by atmospheric pressure measuring mechanism 1 can only be provided when sliding pinion 68 kinematically connects output rack 30' of atmospheric pressure measuring mechanism 1 to altitude display wheel 70, and that the barometric tendency can only be displayed when sliding pinion 68 kinematically connects rack 30' to barometric tendency display wheel 42'. The altitude measurement occurs a priori most of the time and is only interrupted during periods when atmospheric pressure variations are measured; these atmospheric pressure measurements must be performed at constant altitude to avoid distortion. It is thus possible to interrupt the altitude measurement, for example in the evening at bedtime, and to start measuring atmospheric pressure changes, then to start the altitude measurement again, for example on wakening, without the displayed altitude value being modified by any weather changes which occurred during the night.

Figure 5:
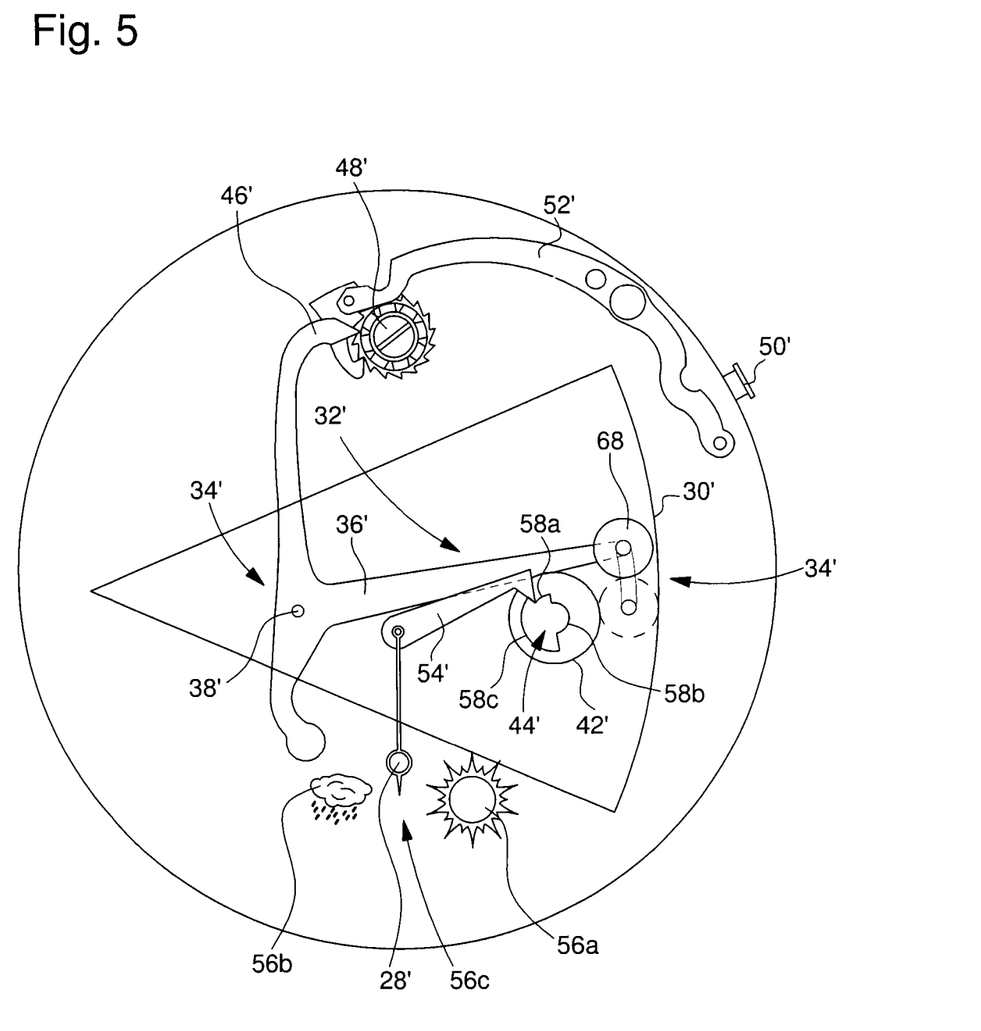
FIG. 5 is a schematic diagram of a variant embodiment of the barometric tendency display device illustrated in FIG. 4.

According to a simplified variant embodiment of the invention illustrated in FIG. 5, the altitude display device 60' is omitted and only barometric tendency display device 32' remains.

Figure 6:
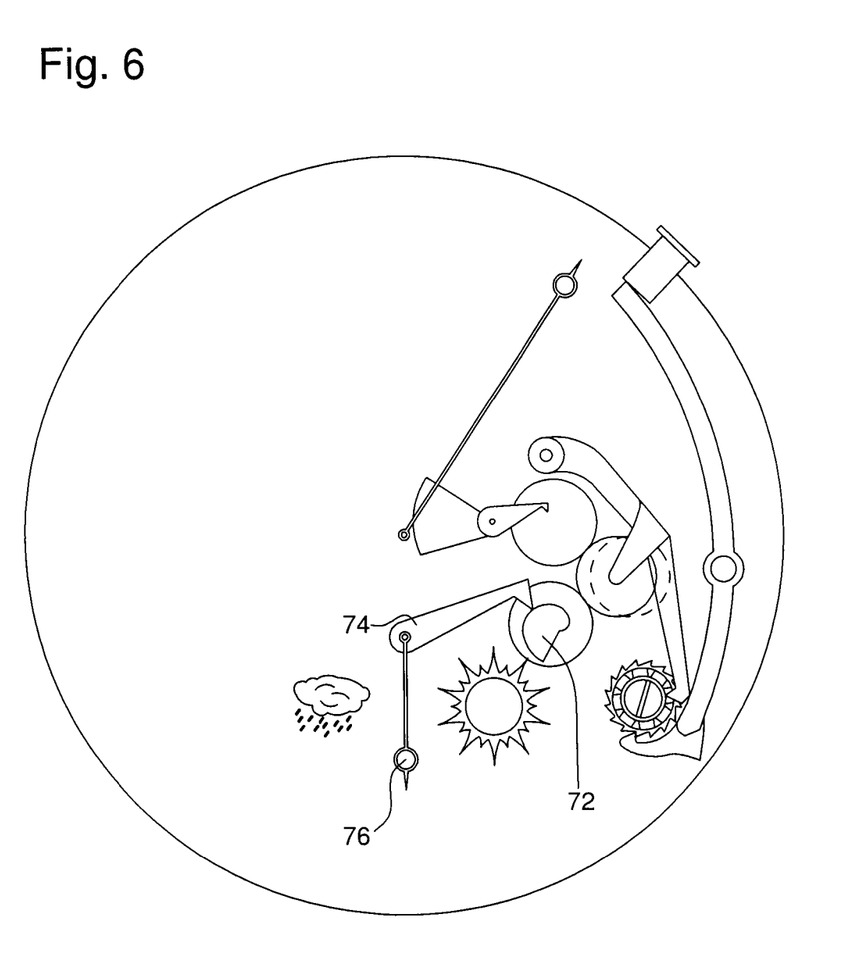
FIG. 6 is a schematic diagram of a cam with a snail profile also well suited to the requirements of the invention.

FIG. 6 is a schematic diagram of a cam 72 with a snail profile which is also suited to the requirements of the invention. Cam 72 may replace the first barometric tendency display cam 40, 44'. For this purpose, the snail profile of cam 72 is calculated so that the cooperation between cam 72 and a feeler arm 74 carrying a hand 76 provides a representative display of measured atmospheric pressure fluctuations.

It goes without saying that this invention is not limited to the embodiments that have just been described and that various simple alterations and variants can be envisaged by those skilled in the art without departing from the scope of the invention as defined by the annexed claims.

What is claimed is:

1. A portable object comprising:
    a mechanism for measuring atmospheric pressure, the atmospheric pressure measuring mechanism including an atmospheric pressure sensor whose geometric dimensions vary with atmospheric pressure fluctuations, wherein the variations in the geometric dimensions of the atmospheric pressure sensor are applied to a device displaying a barometric tendency connected to the atmospheric pressure sensor via a coupling mechanism actuated by a user,
    wherein the coupling mechanism is switchable on demand of the user between a first position, in which a kinematic connection between the atmospheric pressure sensor and the barometric tendency display device is interrupted, and a second position in which the barometric tendency display device is kinematically coupled to the atmospheric pressure sensor.

2. The portable object according to claim 1, wherein the barometric tendency display device includes a first barometric tendency display cam.

3. The portable object according to claim 2, wherein the first barometric tendency display cam has a profile of intermediate radius framed by a profile of smaller radius and by a profile of greater radius.

4. The portable object according to claim 2, wherein the first display cam is a cam with a snail profile.

5. The portable object according to claim 1, wherein the atmospheric pressure sensor is a mechanical pressure sensor.

6. The portable object according to claim 5, wherein the atmospheric pressure sensor is an aneroid type sensor.

7. The portable object according to claim 5, wherein the coupling mechanism includes a coupling wheel carried by a coupling lever, wherein the coupling lever is actuatable by the user between a first position in which the coupling wheel is free, and a second position in which the coupling wheel provides the kinematic connection between the atmospheric pressure sensor and a barometric tendency display wheel to which the first barometric tendency display cam is connected.

8. The portable object according to claim 6, wherein the coupling mechanism includes a coupling wheel carried by a coupling lever, wherein the coupling lever is actuatable by the user between a first position in which the coupling wheel is free, and a second position in which the coupling wheel provides the kinematic connection between the atmospheric pressure sensor and a barometric tendency display wheel to which the first barometric tendency display cam is connected.

9. The portable object according to claim 7, wherein the coupling lever, to be able to switch the coupling mechanism between the first and second positions, is provided with a beak via which the coupling lever bears on a column wheel whose movement is controlled by the user via a push button and a control lever.

10. The portable object according to claim 8, wherein the coupling lever, to be able to switch the coupling mechanism between the first and second positions, is provided with a beak via which the coupling lever bears on a column wheel whose movement is controlled by the user via a push button and a control lever.

11. The portable object according to claim 5, wherein an altitude display device is inserted between the atmospheric pressure sensor and the coupling mechanism, wherein the altitude display device is permanently meshed with the atmospheric pressure sensor and is temporarily meshed with the barometric tendency display device when the coupling mechanism is actuated.

12. The portable object according to claim 6, wherein an altitude display device is inserted between the atmospheric pressure sensor and the coupling mechanism, wherein the altitude display device is permanently meshed with the atmospheric pressure sensor and is temporarily meshed with the barometric tendency display device when the coupling mechanism is actuated.

13. The portable object according to claim 11, wherein the altitude display device includes a second cam whose profile represents altitude variation with atmospheric pressure and is followed by a second feeler arm that carries a second altitude indicator hand.

14. The portable object according to claim 12, wherein the altitude display device includes a second cam whose profile represents altitude variation with atmospheric pressure and is followed by a second feeler arm that carries a second altitude indicator hand.

15. The portable object according to claim 5, wherein the coupling mechanism is switchable on demand of the user between a first position in which the coupling mechanism is only meshed with the atmospheric pressure sensor, and a second position in which the coupling mechanism provides a kinematic connection between the atmospheric pressure sensor and the barometric tendency display device.

16. The portable object according to claim 6, wherein the coupling mechanism is switchable on demand of the user between a first position in which the coupling mechanism is only meshed with the atmospheric pressure sensor, and a second position in which the coupling mechanism provides a kinematic connection between the atmospheric pressure sensor and the barometric tendency display device.

17. The portable object according to claim 15, wherein the coupling mechanism includes a sliding pinion carried by a coupling lever, wherein the coupling lever is actuatable by the user between a first position in which the sliding pinion is only meshed with the atmospheric pressure sensor, and a second position in which the sliding pinion provides the kinematic connection between the atmospheric pressure sensor and a barometric tendency display wheel to which the first barometric display cam is connected.

18. The portable object according to claim 16, wherein the coupling mechanism includes a sliding pinion carried by a coupling lever, wherein the coupling lever is actuatable by the user between a first position in which the sliding pinion is only meshed with the atmospheric pressure sensor, and a second position in which the sliding pinion provides the kinematic connection between the atmospheric pressure sensor and a barometric tendency display wheel to which the first barometric display cam is connected.

19. The portable object according to claim 17, wherein the coupling lever, to be able to switch the coupling mechanism between the first and second positions, is provided with a beak via which the coupling lever bears on a column wheel whose movement is controlled by the user via a push button and a control lever.

20. The portable object according to claim 18, wherein the coupling lever, to be able to switch the coupling mechanism between the first and second positions, is provided with a beak via which the coupling lever bears on a column wheel whose movement is controlled by the user via a push button and a control lever.

21. The portable object according to claim 15, wherein, in the first position thereof, the coupling mechanism provides the kinematic connection between the atmospheric pressure sensor and an altitude display device.

22. The portable object according to claim 16, wherein, in the first position thereof, the coupling mechanism provides the kinematic connection between the atmospheric pressure sensor and an altitude display device.

23. The portable object according to claim 17, wherein, in the first position thereof, the coupling mechanism provides the kinematic connection between the atmospheric pressure sensor and an altitude display device.

24. The portable object according to claim 18, wherein, in the first position thereof, the coupling mechanism provides the kinematic connection between the atmospheric pressure sensor and an altitude display device.

25. The portable object according to claim 19, wherein, in the first position thereof, the coupling mechanism provides the kinematic connection between the atmospheric pressure sensor and an altitude display device.

26. The portable object according to claim 20, wherein, in the first position thereof, the coupling mechanism provides the kinematic connection between the atmospheric pressure sensor and an altitude display device.

27. The portable object according to claim 21, wherein a second cam is connected to the atmospheric pressure measuring sensor, wherein the profile of the second cam, which represents the variation in altitude with atmospheric pressure, is followed by a second feeler arm which carries a second altitude indicator hand.

* * * * *